(12) United States Patent
Gusler et al.

(10) Patent No.: US 9,462,335 B2
(45) Date of Patent: *Oct. 4, 2016

(54) EFFICIENTLY IDENTIFYING TELEVISION STATIONS IN A USER FRIENDLY ENVIRONMENT

(71) Applicant: International Business Machines Corporation, Armonk, NY (US)

(72) Inventors: Carl P. Gusler, Austin, TX (US); Rick A. Hamilton, II, Charlottesville, VA (US)

(73) Assignee: International Business Machines Corporation, Armonk, NY (US)

(*) Notice: Subject to any disclaimer, the term of this patent is extended or adjusted under 35 U.S.C. 154(b) by 891 days.

This patent is subject to a terminal disclaimer.

(21) Appl. No.: 13/689,987

(22) Filed: Nov. 30, 2012

(65) Prior Publication Data

US 2013/0132990 A1 May 23, 2013

Related U.S. Application Data

(63) Continuation of application No. 10/004,926, filed on Dec. 5, 2001, now Pat. No. 8,332,890.

(51) Int. Cl.

| | |
|---|---|
| *H04N 5/445* | (2011.01) |
| *G06F 13/00* | (2006.01) |
| *G06F 3/00* | (2006.01) |
| *H04N 21/442* | (2011.01) |
| *H04N 21/438* | (2011.01) |
| *H04N 21/482* | (2011.01) |
| *H04N 21/84* | (2011.01) |
| *H04N 21/431* | (2011.01) |

(52) U.S. Cl.
CPC .... *H04N 21/44222* (2013.01); *H04N 5/44543* (2013.01); *H04N 21/4312* (2013.01); *H04N 21/4383* (2013.01); *H04N 21/482* (2013.01); *H04N 21/84* (2013.01)

(58) Field of Classification Search
CPC ........... H04N 5/44543; H04N 21/482; H04N 21/4532
USPC .................... 725/44–47; 707/1–10, 100–102
See application file for complete search history.

(56) References Cited

U.S. PATENT DOCUMENTS

| | | |
|---|---|---|
| 5,404,505 A | 4/1995 | Levinson |
| 5,479,508 A | 12/1995 | Bestler et al. |
| 5,502,493 A | 3/1996 | Meyer |
| 6,061,056 A * | 5/2000 | Menard ............... H04N 5/4401 348/E5.108 |
| 6,122,392 A | 9/2000 | Rhoads |

(Continued)

OTHER PUBLICATIONS

Office Action issued on Aug. 18, 2006 for U.S. Appl. No. 10/004,926, 11 pages.

(Continued)

*Primary Examiner* — Jason Salce
(74) *Attorney, Agent, or Firm* — Yee & Associates, P.C.; Lisa J. Ulrich

(57) ABSTRACT

An entertainment unit is configured to receive broadcast signals for a plurality of television stations may display folders. Each folder may comprise one or more as the folder. Furthermore, the entertainment unit may display one or more indications associated with one or more television stations based on content-based input from the viewer. Upon the viewer selecting a particular indication, the television station associated with that indication may be displayed.

13 Claims, 6 Drawing Sheets

(56) References Cited

U.S. PATENT DOCUMENTS

| | | |
|---|---|---|
| 6,215,526 B1 | 4/2001 | Barton et al. |
| 6,233,389 B1 | 5/2001 | Barton et al. |
| 6,240,421 B1 | 5/2001 | Stolarz |
| 6,728,966 B1 | 4/2004 | Arsenault et al. |
| 7,146,627 B1 | 12/2006 | Ismail et al. |
| 7,685,520 B2 | 3/2010 | Rashkovskiy et al. |
| 2002/0056104 A1 | 5/2002 | Burnhouse et al. |
| 2002/0162108 A1 | 10/2002 | Lin-Hendel |
| 2003/0018971 A1 | 1/2003 | McKenna, Jr. |
| 2003/0093790 A1* | 5/2003 | Logan ............... G06F 17/30265 725/38 |
| 2003/0106061 A1 | 6/2003 | Gusler et al. |
| 2004/0034867 A1 | 2/2004 | Rashkovskiy et al. |
| 2005/0086688 A1* | 4/2005 | Omoigui ............... H04H 60/33 725/35 |

OTHER PUBLICATIONS

Office Action issued on Jan. 29, 2007 for U.S. Appl. No. 10/004,926, 13 pages.

Final Office Action issued on Jul. 12, 2007 for U.S. Appl. No. 10/004,926, 15 pages.

Office Action issued on Feb. 5, 2008 for U.S. Appl. No. 10/004,926, 14 pages.

Final Office Action issued on Aug. 7, 2008 for U.S. Appl. No. 10/004,926, 10 pages.

BPAI Decision dated May 15, 2012 for U.S. Appl. No. 10/004,926, 8 pages.

Notice of Allowance issued on Aug. 1, 2012 for U.S. Appl. No. 10/004,926, 7 pages.

* cited by examiner

EFFICIENTLY IDENTIFYING TELEVISION STATIONS IN A USER FRIENDLY ENVIRONMENT

This application is a Continuation of and claims the benefit of priority to U.S. application Ser. No. 10/004,926, filed on Dec. 5, 2001 and entitled "Efficiently Identifying Television Stations in a User Friendly Environment, the contents of which are hereby incorporated by reference.

TECHNICAL FIELD

The present invention relates to the field of broadcasting technology, and more particularly to allowing a user of a unit configured to receive television broadcast signals the ability to efficiently identify television stations in a user friendly environment.

BACKGROUND INFORMATION

Television broadcasting technology has improved tremendously since its inception. Today, television signals are broadcast on the airwaves through cables and via satellite. The number of television stations accessible today has increased from one to hundreds of stations. To select a program to view, many viewers may perform what is commonly referred to as "channel surfing" until they find a channel that has a desired program. Channel surfing may refer to the process of using the channel "+" or "−" button on a remote control to sequentially view each channel However, channel surfing may involve the television viewer spending an inordinate amount of time in searching for the desired channel Channel surfing may be avoided if the television viewer recalls the particular channel(s) airing the programs of interest. For example, suppose a television viewer desires to watch the news. Under the current technology, the television viewer may have to sequentially view each channel to find a station airing news or else recall the particular television channels that air news programs However, the television viewer may not be able to recall which particular television channels air news programs Furthermore, the television viewer may not know or be able to recall which television channels air news programs at the particular time of day the viewer desires to watch the news. Furthermore, the television viewer may not know if unscheduled news programs are airing. Subsequently, the television viewer's search for particular channels airing programs of interests may be inefficient and time consuming.

It would therefore be desirable for the television viewer to efficiently identify television stations of interest in a user-friendly environment.

SUMMARY

The problems outlined above may at least in part be solved in some embodiments by displaying folders of classifications where each folder may comprise indications, e.g., icons, associated with television stations, e.g., CNN™, that a viewer may select in order to view that particular television station.

In one embodiment of the present invention, a method for identifying television stations in a user-friendly environment may comprise the step of an entertainment unit receiving broadcast signals for a plurality of television stations, e.g., ESPN™, CNN™. Furthermore, the broadcast signals may include tags for identifying a classification associated with each of the television stations broadcasted. A classification may refer to the type of broadcast, e.g., news, sports, soap operas, travel, cartoons, movies, etc., being broadcasted by that television station. The tags may further comprise content information associated with the television programs currently airing on the television stations broadcasted.

A determination may be made as to whether the received broadcast signals include tags with classification information, i.e., the classifications associated with each of the television stations broadcasted. If there are no tags with classification information in the received broadcast signals, then one or more folders, e.g., news folder, comprising one or more indications, e.g., icons, associated with one or more television stations, e.g., CNN™, may be displayed on the entertainment unit according to a base set.

Each folder, e.g., news folder, may comprise one or more indications, e.g., icons, associated with the classification of that folder, e.g., news folder. That is, each folder, e.g., news folder, may comprise one or more indications, e.g., icons, associated with television stations, e.g., CNN™, that air television programs that are classified within the same classification of the folder, e.g., news folder. The indications, e.g., icons, of television stations in the same classification as the folder, e.g., news folder, may be displayed on the entertainment unit upon the viewer of the entertainment unit selecting that folder.

If, however, there are tags with classification information in the received broadcast signals, then the tags may be compared with a list of one or more classifications associated with one or more television stations stored in a storage unit. In another embodiment, the list of one or more classifications associated with one or more television stations may be stored in a database. The database may be coupled to the entertainment unit such as via a network, e.g., LAN, WAN.

A determination may then be made as to whether there is a difference between the list of one or more classifications associated with one or more television stations and the tags. If there is no difference, then one or more folders comprising one or more indications, e.g., icons, associated with one or more television stations may be displayed on the entertainment unit according to the base set.

If, however, there is a difference between the list of one or more classifications associated with one or more television stations and the tags, then the list may be updated. The updated list may then become the base set list of one or more classifications associated with one or more television stations. One or more folders comprising one or more indications, e.g., icons, associated with television stations may then be displayed on the entertainment unit according to the updated base set.

Upon displaying one or more folders, e.g., news folder, according to the base set or updated base set, a determination may be made as to whether the entertainment unit received an input to add or delete a particular folder to be displayed or withdrawn from the display of the entertainment unit, respectively, by the viewer of the entertainment unit. If the entertainment unit received an input to add or delete a particular folder to be displayed or withdrawn from the display, respectively, then a particular folder may be added or deleted.

If the entertainment unit did not receive an input to add or delete a particular folder to be displayed or withdrawn from the display, respectively, then a determination may be made as to whether the entertainment unit received an input to add or delete a particular indication, e.g., icon, associated with a particular classification, e.g., news, sports, soap operas, travel, cartoons, movies, of a particular folder. If the entertainment unit received an input to add or delete a particular indication, e.g., icon, to be displayed or withdrawn from the display of the entertainment unit, respectively, then a particular indication, e.g., icon, may be added or deleted.

If the entertainment unit did not receive an input to add or delete a particular indication, e.g., icon, to be displayed or withdrawn from the display, respectively, then the current display of one or more folders and/or one or more indications, e.g., icons, may continue.

Upon adding or deleting a particular folder or a particular indication, e.g., icon, or continuing to display the current display of one or more folders and/or one or more indications, e.g., icons, a determination may be made as to whether the entertainment unit received an input to select a particular indication, e.g., icon of CNN™, associated with a particular classification, e.g., news, of a particular folder, e.g., news folder. If the entertainment unit received an input to select a particular indication, e.g., icon of CNN™, from the viewer of the entertainment unit, then the television station, e.g., CNN™, associated with the selected indication, e.g., icon of CNN™, may be displayed.

If the entertainment unit did not receive an input to select a particular indication, e.g., icon of CNN™, from the viewer of the entertainment unit, then the entertainment unit may again determine if the received broadcast signals include tags with classification information, i.e., the classifications associated with each of the television stations broadcasted, in order to determine if the classifications for the television stations have changed. Tags may be inserted in an analog or digital broadcast signal periodically, e.g., approximately every three seconds, or continuously in the broadcast signal. Subsequently, the display of the folders and/or indications may have to be updated as explained above as the classifications for the television stations may change. For example, a television station may air a movie from 8:00 p.m. to 10:00 p.m. and the news from 10:00 p.m. to 11:00 p.m. Subsequently, the indication, e.g., icon, associated with that television station may be moved from one folder to another.

In one embodiment of the present invention, a method for identifying television stations of interest based on content specified by the viewer of the entertainment unit may comprise the step of the entertainment unit receiving broadcast signals that include tags where the tags may comprise content information associated with television programs currently airing on the television stations broadcasted. In one embodiment, the content information may be in the form of keywords. For example, a football game featuring the University of Michigan Wolverines may be associated with the keywords "University of Michigan." These keywords may be stored in a storage unit or in a database coupled to the entertainment unit via a network, e.g., LAN, WAN, or in any other type of storage device.

Upon the entertainment unit receiving input, e.g., "University of Michigan", to identify one or more television stations that are currently airing television programs with matching content inputted from the viewer of the entertainment unit, a comparison may then be made between the content information stored in the storage device and the input received from the viewer of the entertainment unit.

A determination may then be made as to whether there is a match between the input received from the viewer of the entertainment unit and the content information stored in the storage device. If there is not a match, then a notification may be displayed on the entertainment unit indicating that the input received was not identified in any content of the television programs currently airing.

If there is a match, then one or more indications, e.g., icons, associated with one or more television stations airing television programs whose content matched the input received from the viewer of the entertainment unit may be displayed on the entertainment unit. In one embodiment, a profile associated with each indication, e.g., icon, may be displayed on the entertainment unit providing further detailed information, e.g., football game, movie, about the television program currently airing on the television station associated with the indication. By learning further detailed information about the television program currently airing on the television station associated with the indication, the viewer may then decide whether to view that television program.

The entertainment unit may then receive input from the viewer to select a particular indication, e.g., icon, associated with a particular television station. The television station, e.g., CNN™, associated with the selected indication, e.g., icon of CNN™, may subsequently be displayed on the entertainment unit.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
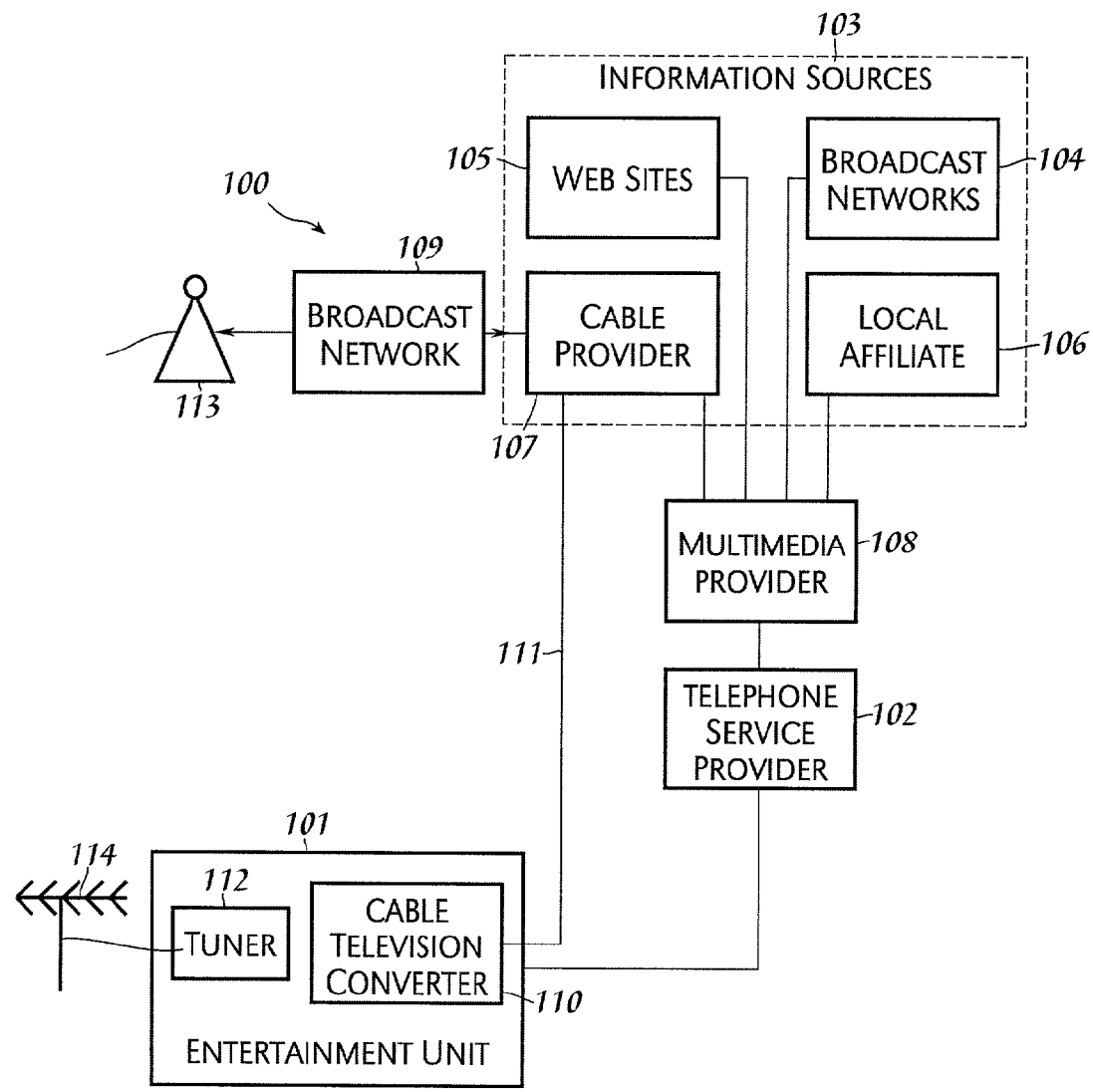
FIG. 1 illustrates a broadcast distribution network configured in accordance with the present invention.

FIG. 1—Broadcast Distribution Network

FIG. 1 illustrates an embodiment of a broadcast distribution network 100 in accordance with the present invention. Broadcast distribution network 100 may comprise an entertainment unit 101 configured to retrieve and display broadcast signals. Entertainment unit 101 may further be configured to display folders comprising indications, e.g., icons, associated with television stations as described in greater detail in FIGS. 3-4. Entertainment unit 101 may further be configured to efficiently identify television stations of interest based on content specified by the viewer of entertainment unit 101 as described in greater detail in FIG. 5. A more detailed description of entertainment unit 101 is provided in FIG. 2.

Referring to FIG. 1, entertainment unit 101 may be coupled to a telephone service provider 102 and thereby access broadcast signals from information sources 103, e.g., broadcast networks 104, web sites 105, local affiliate 106, cable provider 107, via a multimedia provider 108. In other embodiments, entertainment unit 101 may access multimedia provider 108 over other communications links (not shown), bypassing local communication service providers. Faster communication links such as fiber optics, coaxial cable or radio frequency (wireless) links such as a cellular telephone would provide an equally acceptable communication link for the present invention. One skilled in the art may appreciate the many different communication links, which may be utilized to provide the communication path discussed herein, and the communication links discussed herein should not be construed in a limiting manner.

Entertainment unit 101 may further be configured to receive broadcast signals directly from cable provider 107 or broadcast network 109. Typically, a local cable provider 107 receives a signal from a broadcast network 109 and may distribute the signal to a residential dwelling having a cable television converter 110 via a hardwired cable 111. In this manner, entertainment unit 101 may receive broadcast signals from cable provider 107. In another embodiment, cable television converter 110 may reside outside entertainment unit 101 such as in a set-top box. Entertainment unit 101 may further receive broadcast signals from broadcast network 109 by a television tuner card 112 receiving broadcast signals through an antenna system depicted by broadcast antenna 113 and receiver antenna 114. In another embodiment, television tuner card 112 may be implemented in software. It is further noted that entertainment unit 101 may be configured to receive broadcast signals using other means, e.g., direct broadcast satellite, and that FIG. 1 is illustrative. It is further noted that other means for receiving broadcast signals would be recognized by an artisan of ordinary skill in the art and that such embodiments employing such means would fall within the scope of the present invention.

The development of computerized information distribution and interconnected computers allow users to link with other computer networks, and retrieve vast amounts of electronic information heretofore unavailable in an electronic medium. Such electronic information increasingly displaces more conventional techniques of information transmission, such as newspapers and magazines. The term "Internet" may refer to a collection of computer networks interconnected over communication links that utilize standard protocols well known in the art of computer networking.

A basic computer network, including the Internet, typically utilizes a client/server architecture. A "client" may refer to a computer that accesses shared network resources provided by another computer commonly referred to as a server.

A "server" may typically be a remote computer system accessible over a communications medium such as the Internet. The server may scan and search for information sources. Based upon information requested by the user, the server may provide video transmission, e.g., streaming video, to the user. Referring to FIG. 1, entertainment unit 101 may be a client which is capable of receiving information such as broadcast signals. Broadcast signals may be provided by broadcast networks 104, web sites 105, local affiliates 106 and local cable provider 107. However, as would be recognized by those of ordinary skill, the principles of the present invention as discussed hereinbelow are not restricted by a particular signal source.

Figure 2:
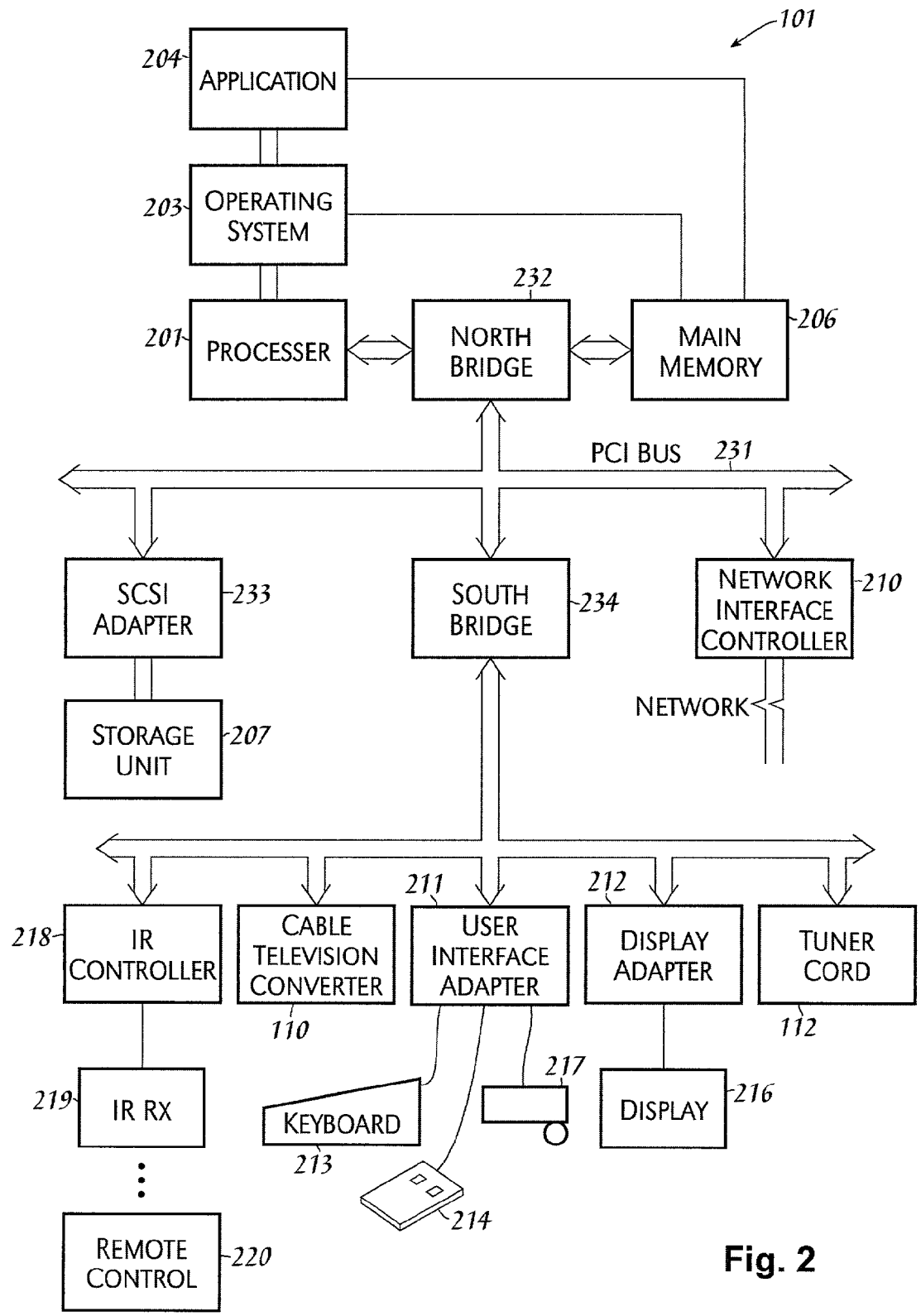
FIG. 2 illustrates an embodiment of an entertainment unit configured in accordance with the present inventive principles.

FIG. 2—Entertainment Unit

FIG. 2 illustrates a typical hardware configuration of entertainment unit 101 which is representative of a hardware environment for practicing the present invention. Entertainment unit 101 may employ a peripheral component interconnect (PCI) local bus architecture. Although the depicted example employs a PCI bus, other bus architectures such as Accelerated Graphics Port (AGP) and Industry Standard Architecture (ISA) may be used. Processor 201 and main memory 206, e.g., Random Access Memory (RAM), may be connected to PCI local bus 231 through north bridge 232. North bridge 232 may also include an integrated memory controller and cache memory (not shown in FIG. 2) for processor 201. Furthermore, an operating system 203 may run on processor 201 to provide control and coordinate the functions of the various components of FIG. 2. An application 204 in accordance with the principles of the present invention may run in conjunction with operation system 203 which may provide services to application 204, for example, handling keystrokes, etc., as would be appreciated by one skilled in the art. Application 204 may include for example, a program for displaying folders comprising indications, e.g., icons, associated with television stations as described in conjunction with FIGS. 3-4; a program for efficiently identifying television stations of interest based on content specified by the viewer of entertainment unit 101 as described in conjunction with FIG. 5; speech recognition software. It should be noted that software components including operating system 203 and application 204 may be loaded into system's main memory 206.

Referring to FIG. 2, additional components coupled to PCI bus 231 may be made through direct component interconnection or through add-in boards. In the depicted example, Small Computer System Interface (SCSI) host bus adapter 233 may be connected to PCI local bus 231 by direct component connection. SCSI adapter 233 may be coupled to storage unit 207, e.g., disk drive. Storage unit 207 may be configured to store a list of television stations, e.g., ESPN™, along with their associated classifications, e.g., sports, that may be updated as well as the content of the television programs currently airing on these television stations as described in greater detail in conjunction with FIG. 5. It is noted that there are other means for storing a list of television stations, e.g., ESPN™, along with associated information, e.g., classifications, content, such as a database (not shown) coupled to entertainment unit 101 and that such means would be recognized by a person of ordinary skill. It is further noted that embodiments employing such means would fall within the scope of the present invention. It is further noted that the program of the present invention that displays folders comprising indications, e.g., icons, associated with television stations on display 216 as described in conjunction with FIGS. 3-4 may reside in storage unit 207 or in application 204. It is further noted that the program of the present invention that efficiently identifies television stations of interest based on content specified by the viewer of entertainment unit 101 as described in conjunction with FIG. 5 may reside in storage unit 207 or in application 204. It is further noted that speech recognition software may reside in storage unit 207 or in application 204.

Furthermore, south bridge 234 may be connected to PCI local bus 231 by direct component connection. South bridge 234 may provide a connection for a tuner card 112 and cable television converter 110. Tuner card 112 may be configured to receive television broadcast signals. In another embodiment, tuner card 112 may be implemented in software that may reside in application 204 or in storage unit 207. Cable television converter 110 may be configured to receive television broadcast signals. In another embodiment, cable television converter 110 may be implemented in software that may reside in application 204 or in storage unit 207.

South bridge 234 may further be connected to an Infrared (IR) controller 218. IR controller 218 may be a dedicated controller configured for processing an infrared code received by an IR receiver 219 and for capturing the same as data. IR receiver 219 may receive an infrared code from a remote control 220 accessed by the viewer of entertainment unit 101.

South bridge 234 may further be connected to Input/Output (I/O) devices via a user interface adapter 211 and a display adapter 212. Keyboard 215, mouse 214, speaker 215 and microphone 217 may be interconnected to south bridge 234 through user interface adapter 211. Event data may be inputted to entertainment unit 101 through any of these devices. A display monitor 216 may be connected to south bridge 234 by display adapter 212. Display monitor 216 may be configured to display broadcast signals received by entertainment unit 101. Display monitor 216 may further be configured to display folders comprising indications, e.g., icons, associated with television stations as described in conjunction with FIGS. 3-4. Display monitor 216 may further be configured to display indications, e.g., icons, associated with television stations currently airing television programs based on content specified by the viewer of entertainment unit 101 as described in conjunction with FIG. 5. In this manner, a viewer of entertainment unit 101 may be capable of inputting to entertainment unit 101 through keyboard 213, mouse 214, microphone 217 or remote control 220 and receiving output from entertainment unit 101 via display 216 or speaker 215.

Referring to FIG. 2, network interface controller 210 may be connected to PCI local bus 231 by direct component connection. Network interface controller 210 may interconnect PCI local bus 231 with an outside network enabling entertainment unit 101 to communicate with a server (not shown) to receive broadcast signals as described above via a Local Area Network (LAN), e.g., Ethernet, Token Ring, ARCnet, or a Wide Area Network (WAN), e.g., Internet.

Implementations of the invention include implementations as a unit programmed to execute the method or methods described herein, and as a computer program product. According to implementations, sets of instructions for executing the method or methods are resident in random access memory 206 of one or more units configured generally as described above. Until required by entertainment unit 101, the set of instructions may be stored as a computer program product in another memory unit, for example, in storage unit 207 (which may include a removable memory such as an optical disk or floppy disk for eventual use in storage unit 207). Furthermore, the computer program product may also be stored at another unit and transmitted when desired to entertainment unit 101 by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Figure 3A:
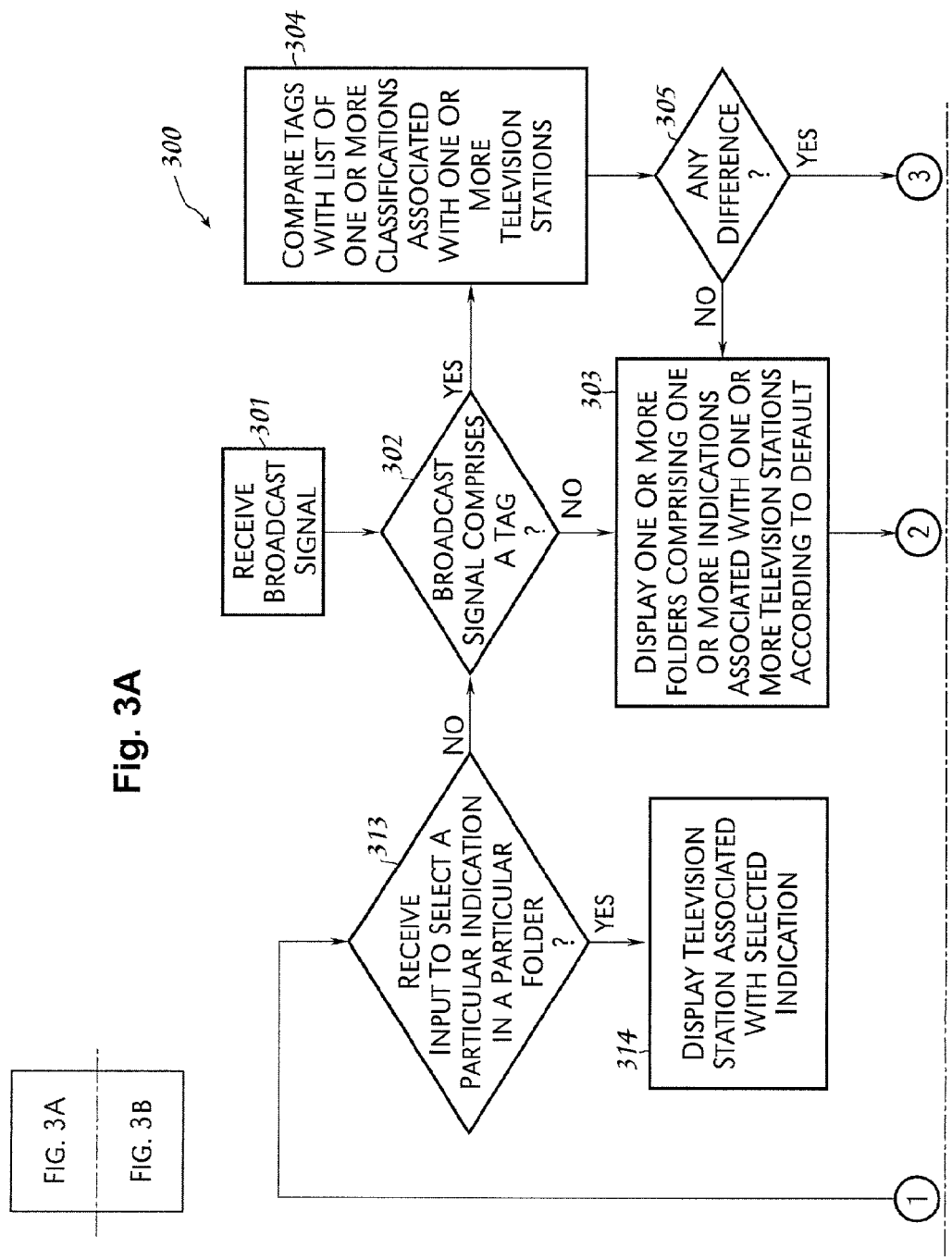
FIG. 3A is a first portion of a flowchart of a method for efficiently identifying television stations in a user-friendly environment in accordance with the present invention.
Figure 3B:
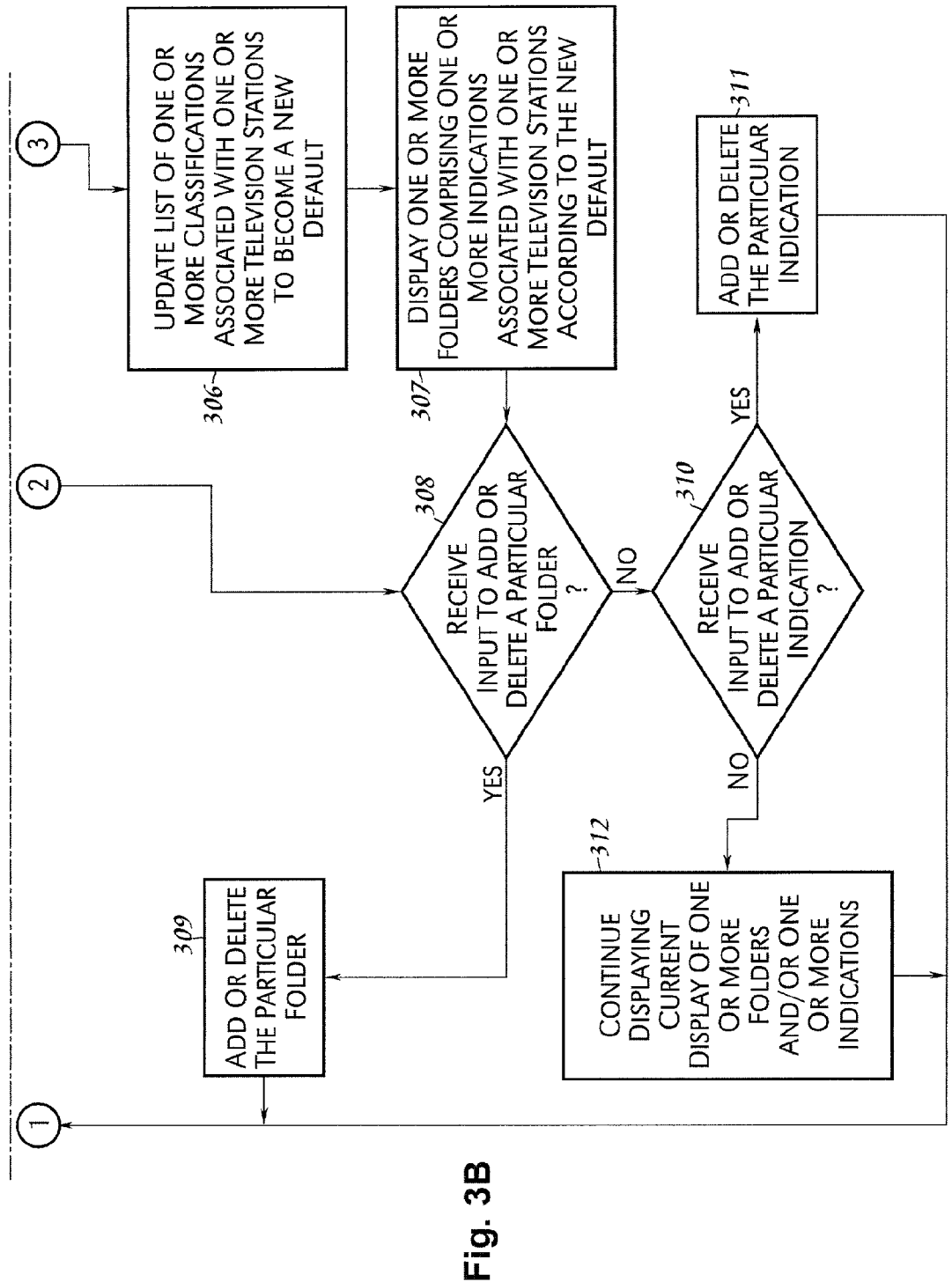
FIG. 3B is a second portion of the flowchart of a method for efficiently identifying television stations in a user-friendly environment in accordance with the present invention presented in FIG. 3A.
Figure 5:
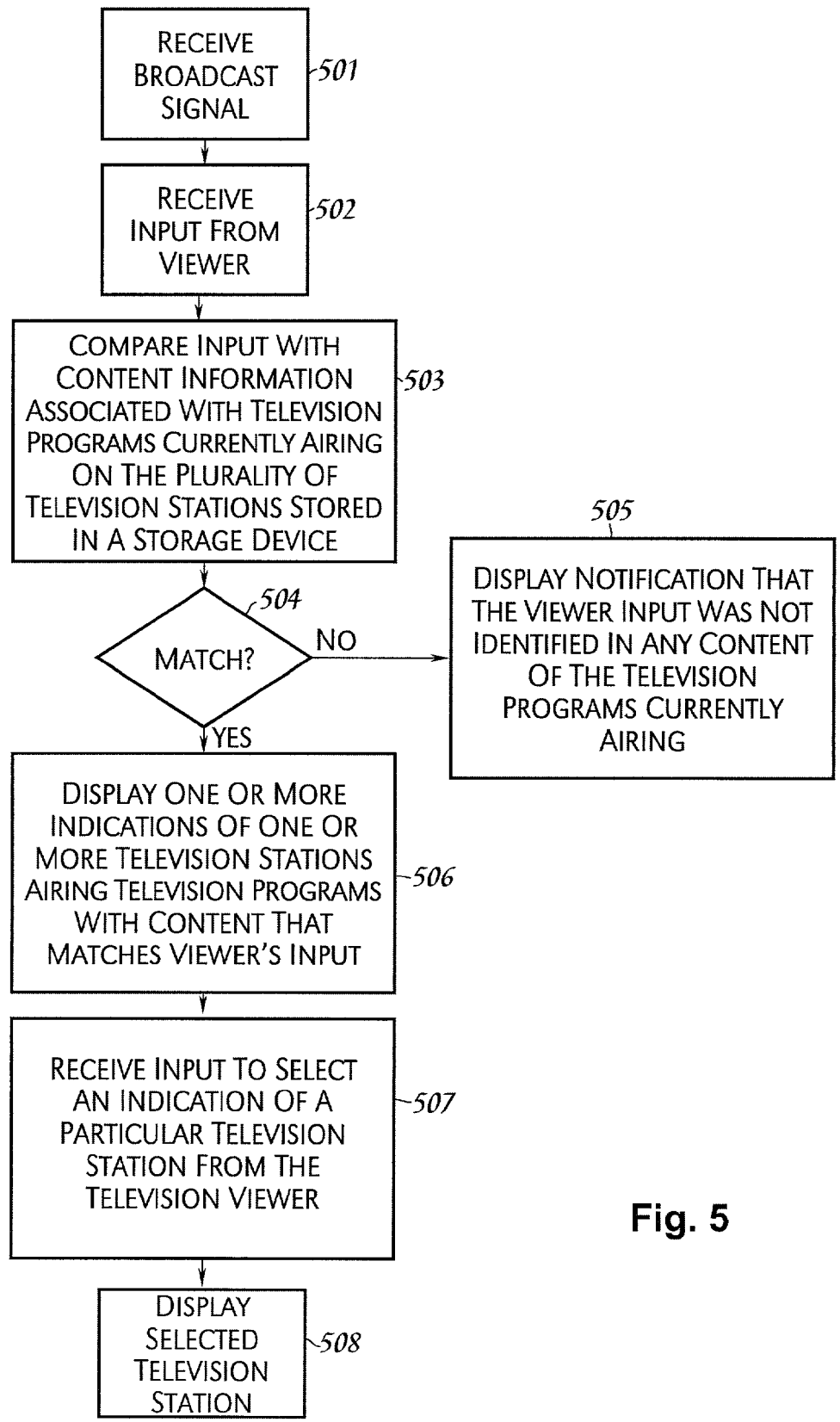
FIG. 5 is a flowchart of method for identifying television stations of interest based on content specified by a viewer of entertainment unit.

FIGS. 3A and 3B—Method for Identifying Television Stations in a User Friendly Environment FIGS. 3A and 3B are a flowchart of one embodiment of the present invention of a method 300 for identifying television stations in a user-friendly environment. As stated in the Background Information section, channel surfing may be avoided if the television viewer recalls the particular channel(s) airing the programs of interest. For example, suppose a television viewer desires to watch the news. Under the current technology, the television viewer may have to sequentially view each channel to find a station airing news or else recall the particular television channels that air news programs However, the television viewer may not be able to recall which particular television channels air news programs Furthermore, the television viewer may not know or be able to recall which television channels air news programs at the particular time of day the user desires to watch the news. Furthermore, the television viewer may not know if unscheduled news programs are airing. Subsequently, the television viewer's search for particular channels airing programs of interests may be inefficient and time consuming. It would therefore be desirable for the television viewer to efficiently identify television stations of interest in a user-friendly environment. Method 300 is a method for efficiently identifying television stations of interest. Method 500, as discussed in FIG. 5, is a method for efficiently identifying television stations of interest based on content specified by the viewer of entertainment unit 101.

Referring to FIGS. 3A and 3B, in step 301, entertainment unit 101 (FIG. 2) may receive broadcast signals. As discussed above in conjunction with FIGS. 1 and 2, entertainment unit 101 may be configured to receive a broadcast signal from a broadcast network 109 by a tuner 112, that may be embodied in hardware or software, receiving the broadcast signal through an antenna system depicted by broadcast antenna 113 and receiver antenna 114. Entertainment unit 101 may further be configured to receive a multiplicity of broadcast signals from cable provider 107 by cable television converter 110, that may be embodied in hardware or software, receiving the broadcast signal through hardwired cable 111. Entertainment unit 101 may further be configured to receive a multiplicity of broadcast signals from multimedia provider 108 via telephone service provider 102. Multimedia provider 108 may be configured to provide broadcast signals from a variety of information sources 103, e.g., broadcast networks 104, web sites 105, local affiliate 106, cable provider 107. It is noted that entertainment unit 101 may be configured to receive broadcast signals using other means recognized by an artisan of ordinary skill in the art and that such embodiments employing such means would fall within the scope of the present invention.

The broadcast signals may include tags for identifying a classification associated with each of the television stations broadcasted. A classification may refer to the type of broadcast, e.g., news, sports, soap operas, travel, cartoons, movies, etc., being broadcasted by that television station. In one embodiment, tags may further comprise content information associated with the television programs currently airing on the television stations broadcasted. A description of identifying television stations of interest based on the content of the television programs currently airing is provided in FIG. 5.

In one embodiment, tags may be superimposed with the analog broadcast signals by inserting tags periodically, e.g., approximately every three seconds, or continuously in the vertical blanking interval of the signal or in either the audio or live video stream. It is noted there are numerous means of superimposing tags with analog broadcast signals and that such means would be recognized by an artisan of ordinary skill in the art. It is further noted that embodiments employing such means would fall within the scope of the present invention.

In one embodiment, tags may be periodically, e.g., approximately every three seconds, or continuously inserted in the digital broadcast signals associated with the particular video and audio data stream. It is noted there are numerous means of inserting tags in the digital broadcast signals and that such means would be recognized by an artisan of ordinary skill in the art. It is further noted that embodiments employing such means would fall within the scope of the present invention.

In one embodiment, the tags may be inserted in the analog broadcast signals by broadcaster 109. In another embodiment, the tags may be inserted in the analog or digital broadcast signals by local cable provider 107. In another embodiment, the tags may be inserted in the analog or digital broadcast signals by multimedia provider 108. It is noted that the tags may be inserted in the analog or digital broadcast signals by other entities not shown and that the above description is illustrative.

In step 302, a determination may be made as to whether the received broadcast signals include tags with classification information, i.e., the classifications associated with each of the television stations broadcasted. If there are no tags with classification information in the received broadcast signals, then one or more folders comprising one or more indications, e.g., icons, associated with one or more television stations may be displayed on display 216 (FIG. 2) according to the base set in step 303 as illustrated in FIG. 4.

Figure 4:
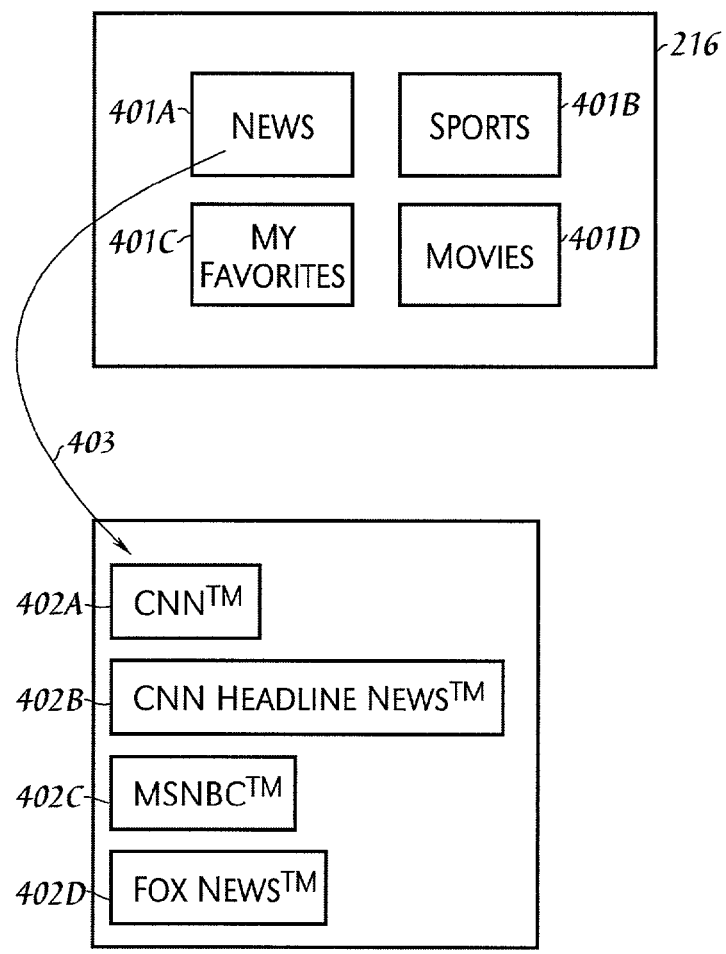
FIG. 4 illustrates displaying a folder comprising an indication associated with a television station displayed on a display of an entertainment unit in accordance with the present invention.

FIG. 4 illustrates an embodiment of the present invention of displaying one or more folders comprising one or more indications, e.g., icons, associated with one or more television stations displayed on display 216. Referring to FIG. 4, one or more folders 401A-D associated with one or more classifications, e.g., news, sports, soap operas, travel, cartoons, movies, may be displayed on display 216. Folders 401A-D may collectively or individually be referred to as folders 401 or folder 401, respectively. Each folder may be associated with a particular classification. For example, folder 401A may be associated with news. Folder 401B may be associated with sports. Folder 401C may be a folder 401 created by the viewer of entertainment unit 101 as discussed further below. Folder 401D may be associated with movies. It is noted that any number of folders 401 may be displayed on display 216 and that FIG. 4 is illustrative.

Each folder 401 may comprise one or more indications, e.g., icons, associated with the classification of that folder 401. That is, each folder 401 may comprise one or more indications, e.g., icons, associated with television stations that air television programs that are classified within the same classification of folder 401. These indications, e.g., icons, may be displayed on display 216 upon the viewer of entertainment unit 101 selecting folder 401 as illustrated by arrow 403. In one embodiment, the viewer of entertainment unit 101 may select a particular folder 401 to view the indication(s) of television stations in the same classification as folder 401 by selecting mouse 214 when the cursor rests on folder 401. In another embodiment, the viewer of entertainment unit 101 may select a particular folder 401 to view the indication(s) of television stations in the same classification as folder 401 via remote control 220 (FIG. 2). For example, folder 401A associated with news may be selected to display one or more indications of television stations that air news such as CNN™ 402A, CNN Headline News™ 402B, MSNBC™ 402C and Fox News™ 402D. It is noted that each folder 401 may comprise any number of indications, e.g., icons, associated with television stations and that FIG. 4 is illustrative.

Referring to step 302 of FIGS. 3A and 3B, if there are tags with classification information in the received broadcast signals, then tags may be compared, in step 304, with a list of one or more classifications associated with one or more television stations stored in storage unit 207 (FIG. 2). In another embodiment, the list of one or more classifications associated with one or more television stations may be stored in a database. The database may be coupled to entertainment unit 101 such as via a network, e.g., LAN, WAN.

A determination may then be made as to whether there is a difference between the list of one or more classifications associated with one or more television stations and the tags in step 305. If there is no difference, then one or more folders comprising one or more indications, e.g., icons, associated with one or more television stations may be displayed on display 216 according to the base set in step 303.

If there is a difference between the list of one or more classifications associated with one or more television stations and the tags, then the list may be updated in step 306. The updated list may then become the base set list of one or more classifications associated with one or more television stations.

In step 307, one or more folders 401 comprising one or more indications, e.g., icons, associated with television stations may be displayed on display 216 as illustrated in FIG. 4 according to the updated base set.

In step 308, a determination may be made as to whether entertainment unit 101 received an input to add or delete a particular folder 401 to be displayed or withdrawn from display 216, respectively, by the viewer of entertainment unit 101. In one embodiment, the viewer of entertainment unit 101 may input to add or delete a particular folder 401 to be displayed or withdrawn from display 216, respectively, via speech. That is, the viewer may verbally communicate to add or delete a particular folder 401 where the verbal communications may be received by microphone 217 and recognized by speech recognition software stored in storage unit 207 (FIG. 2) or in application 204 (FIG. 2). In another embodiment, the viewer of entertainment unit 101 may input to add or delete a particular folder 401 to be displayed or withdrawn from display 216, respectively, via keyboard 215. In another embodiment, the viewer of entertainment unit 101 may input to add or delete a particular folder 401 to be displayed or withdrawn from display 216, respectively, via remote control 220. In another embodiment, the viewer of entertainment unit 101 may input to add or delete a particular folder 401 to be displayed or withdrawn from display 216, respectively, via mouse 215. It is noted there are numerous means of the viewer inputting to entertainment unit 101 to add or delete a particular folder 401 to be displayed or withdrawn from display 216 and that such means would be recognized by an artisan of ordinary skill in the art. It is further noted that embodiments employing such means would fall within the scope of the present invention.

If entertainment unit 101 received an input to add or delete a particular folder 401 to be displayed or withdrawn from display 216, respectively, from the viewer of entertainment unit 101, then a particular folder 401 may be added or deleted in step 309.

If entertainment unit 101 did not receive an input to add or delete a particular folder 401 to be displayed or withdrawn from display 216, respectively, from the viewer of entertainment unit 101, then, in step 310, a determination may be made as to whether entertainment unit 101 received an input to add or delete a particular indication, e.g., icon, associated with a particular classification, e.g., news, sports, soap operas, travel, cartoons, movies, of a particular folder 401. In one embodiment, the viewer of entertainment unit 101 may input to add or delete a particular indication, e.g., icon, to be displayed or withdrawn from display 216, respectively, via speech. That is, the viewer may verbally communicate to add or delete a particular indication, e.g., icon, where the verbal communications may be received by microphone 217 and recognized by speech recognition software stored in storage unit 207 or in application 204. In another embodiment, the viewer of entertainment unit 101 may input to add or delete a particular indication, e.g., icon, to be displayed or withdrawn from display 216, respectively, via keyboard 215. In another embodiment, the viewer of entertainment unit 101 may input to add or delete a particular indication, e.g., icon, to be displayed or withdrawn from display 216, respectively, via remote control 220. In another embodiment, the viewer of entertainment unit 101 may input to add or delete a particular indication, e.g., icon, to be displayed or withdrawn from display 216, respectively, via mouse 215. It is noted there are numerous means of the viewer inputting to entertainment unit 101 to add or delete a particular indication, e.g., icon, to be displayed or withdrawn from display 216 and that such means would be recognized by an artisan of ordinary skill in the art. It is further noted that embodiments employing such means would fall within the scope of the present invention.

If entertainment unit 101 received an input to add or delete a particular indication, e.g., icon, to be displayed or withdrawn from display 216, respectively, from the viewer of entertainment unit 101, then a particular indication, e.g., icon, may be added or deleted in step 311.

If entertainment unit 101 did not receive an input to add or delete a particular indication, e.g., icon, to be displayed or withdrawn from display 216, respectively, from the viewer of entertainment unit 101, then the current display of one or more folders and/or one or more indications, e.g., icons, may continue in step 312.

A determination may be made in step 313 as to whether entertainment unit 101 received an input to select a particular indication, e.g., icon of CNN™ 402A, associated with a particular classification, e.g., news, of a particular folder 401, e.g., news folder 401A. In one embodiment, the viewer of entertainment unit 101 may input to select a particular indication, e.g., icon of CNN™ 402A, via speech. That is, the viewer may verbally communicate to select a particular indication, e.g., icon of CNN™ 402A, where the verbal communications may be received by microphone 217 and recognized by speech recognition software stored in storage unit 207 or in application 204. In another embodiment, the viewer of entertainment unit 101 may input to select a particular indication, e.g., icon of CNN™ 402A, via keyboard 215. In another embodiment, the viewer of entertainment unit 101 may input to select a particular indication, e.g., icon of CNN™ 402A, via remote control 220. In another embodiment, the viewer of entertainment unit 101 may input to select a particular indication via mouse 215. It is noted there are numerous means of the viewer inputting to entertainment unit 101 to select a particular indication, e.g., icon of CNN™ 402A, and that such means would be recognized by an artisan of ordinary skill in the art. It is further noted that embodiments employing such means would fall within the scope of the present invention.

If entertainment unit 101 received an input to select a particular indication, e.g., icon of CNN™ 402A, from the viewer of entertainment unit 101, then, in step 314, the television station, e.g., CNN™, associated with the selected indication, e.g., icon of CNN™ 402A, may be displayed on display 216.

If entertainment unit 101 did not receive an input to select a particular indication, e.g., icon of CNN™ 402A, from the viewer of entertainment unit 101, then, in step 302, entertainment unit 101 may again determine if the received broadcast signals include tags with classification information, i.e., the classifications associated with each of the television stations broadcasted, in order to determine if the classifications for the television stations have changed. As stated above, tags may be inserted in the analog or digital broadcast signals periodically, e.g., approximately every three seconds, or continuously in the broadcast signals. Subsequently, the display of folders 401 and/or indications may have to be updated as explained in steps 304-306 as the classifications for the television stations may change. For example, a television station may air a movie from 8:00 p.m. to 10:00 p.m. and the news from 10:00 p.m. to 11:00 p.m. Subsequently, the indication, e.g., icon, associated with that television station may be moved from one folder 401 to another. It is further noted that in one embodiment when entertainment unit 101 is deactivated, tuner 112, whether embodied in hardware or software, may be configured to continue to receive tags. These tags may then be compared with the base set list of one or more classifications associated with one or more television stations to determine if the base set list needs to be updated.

It is noted that method 300 may be executed in a different order presented and that the order presented in the discussion of FIGS. 3A and 3B is illustrative. It is further noted that certain steps may be executed almost concurrently.

FIG. 5—Method for Efficiently Identifying Television Stations of Interest Based on Content Specified by the Viewer of the Entertainment Unit FIG. 5 is a flowchart of one embodiment of the present invention of a method 500 for identifying television stations of interest based on content specified by the viewer of entertainment unit 101.

In step 501, entertainment unit 101 (FIG. 2) may receive broadcast signals incorporated with tags where the tags may comprise content information associated with television programs currently airing on the television stations broadcasted. In one embodiment, the content information may be in the form of keywords. For example, a football game featuring the University of Michigan Wolverines may be associated with the keywords "University of Michigan." These keywords may be stored in storage unit 207 or in a database coupled to entertainment unit 101 via a network, e.g., LAN, WAN, or in any other type of storage device.

In step 502, entertainment unit 101 may receive input, e.g., "University of Michigan", to identify one or more television stations that are currently airing television programs with matching content inputted by the viewer of entertainment unit 101. As stated above, the tags inserted in the broadcast signals may comprise content associated with television programs currently airing in the form of keywords that may be stored in a storage device, e.g., storage unit 207. In one embodiment, the viewer of entertainment unit 101 may input keywords to be searched in the storage device via speech. That is, the viewer may verbally communicate keywords that may be received by microphone 217 and recognized by speech recognition software stored in storage unit 207 or in application 204. In another embodiment, the viewer of entertainment unit 101 may input keywords to be searched in the storage device via keyboard 215. In another embodiment, the viewer of entertainment unit 101 may input keywords to be searched in the storage device via remote control 220. In another embodiment, the viewer of entertainment unit 101 may input keywords to be searched in the storage device via mouse 215. It is noted there are numerous means of the viewer inputting keywords to be searched in a storage device, e.g., storage unit 207, and that such means would be recognized by an artisan of ordinary skill in the art. It is further noted that embodiments employing such means would fall within the scope of the present invention.

In step 503, a comparison may be made between the content information stored in the storage device, e.g., storage unit 207, and the input received from the viewer of entertainment unit 101.

In step 504, a determination may be made as to whether there is a match between the input received from the viewer of entertainment unit 101 and the content information stored in the storage device, e.g., storage unit 207. If there is not a match, then a notification that input received in step 502 was not identified in any content of the television programs currently airing may be displayed on display 216 in step 505.

If there is a match, then one or more indications, e.g., icons, associated with one or more television stations airing television programs whose content matched the input received from the viewer of entertainment unit 101 may be displayed on display 216 in step 506. In one embodiment, a profile associated with each indication, e.g., icon, may be displayed on display 216 providing further detailed information, e.g., football game, movie, about the television program currently airing on the television station associated with the indication. By learning further detailed information about the television program currently airing on the television station associated with the indication, the viewer may then decide whether to view that television program.

In step 507, entertainment unit 101 may receive input to select a particular indication, e.g., icon, associated with a particular television station from a viewer of entertainment unit 101. In one embodiment, the viewer of entertainment unit 101 may input to select a particular indication, e.g., icon of CNN™ 402A, via speech. That is, the viewer may verbally communicate to select a particular indication where the verbal communications may be received by microphone 217 and recognized by speech recognition software stored in storage unit 207 or in application 204. In another embodiment, the viewer of entertainment unit 101 may input to select a particular indication via keyboard 215. In another embodiment, the viewer of entertainment unit 101 may input to select a particular indication via remote control 220. In another embodiment, the viewer of entertainment unit 101 may input to select a particular indication via mouse 215. It is noted there are numerous means of the viewer inputting to entertainment unit 101 to select a particular indication, e.g., icon of CNN™ 402A, and that such means would be recognized by an artisan of ordinary skill in the art. It is further noted that embodiments employing such means would fall within the scope of the present invention.

In step 508, the television station, e.g., CNN™, associated with the selected indication, e.g., icon of CNN™ 402A, may be displayed on display 216.

It is noted that method 500 may be executed in a different order presented and that the order presented in the discussion of FIG. 5 is illustrative. It is further noted that certain steps in method 500 may be executed almost concurrently.

Although the system, method and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims

The invention claimed is:

1. A computer-implemented method for identifying television programs of interest to a viewer, the computer-implemented method comprising:

receiving, from a viewer of an entertainment unit, by a processor, input specifying a program content, wherein the entertainment unit receives broadcast signals of a plurality of respective television programs currently being broadcast from a plurality of respective television stations, the broadcast signals for the respective television programs including respective tags inserted by one of continuously inserting or periodically inserting into the broadcast signals;

processing, by the processor, the broadcast signals for the respective television programs to identify the respective tags in the broadcast signals received, wherein content information associated with the respective television programs is stored in a storage unit;

responsive to the processor identifying one or more respective tags, comparing, by the processor, the content information associated with the respective television programs stored in the storage unit for one or more respective tags to the input specifying the program content received from the viewer;

responsive to the processor identifying a match of the one or more respective tags with the input specifying the program content, identifying, by the processor, for each of the one or more respective tags, a classification associated with one or more of the plurality of respective television stations broadcasting in the plurality of respective television stations;

identifying, by the processor, respective contents of the respective television programs, wherein the tags comprise content information associated with television programs currently airing on a television station broadcasting, and wherein the content information is in a form of keywords;

and displaying, by the processor, one or more indications associated with one or more television stations airing television programs that respective contents of one or more of the plurality of respective television programs match the input specifying the program content received from the viewer.

2. The computer-implemented method as recited in claim 1 further comprising:

receiving by the processor, input from the viewer to select an indication of the one or more indications; and displaying by the processor, a television station associated with the indication selected.

3. The computer-implemented method as recited in claim 1, wherein the content information is stored in the storage unit, and wherein the content information stored comprises at least one keyword.

4. The computer-implemented method as recited in claim 1, wherein the one or more indications comprise one or more respective icons.

5. A computer program product for identifying television programs of interest to a viewer, the computer program product comprising:

one or more non-transitory computer-readable storage devices having program instructions, executable by a processor, stored on the one or more non-transitory computer-readable storage devices, the program instructions comprising:

program instructions to receive input specifying a program content from a viewer of an entertainment unit, wherein the entertainment unit receives broadcast signals of a plurality of respective television programs currently being broadcast from a plurality of respective television stations, the broadcast signals for the respective television programs including respective tags inserted by one of continuously inserting or periodically inserting into the broadcast signals;

program instructions to process the broadcast signals for the respective television programs to identify the respective tags in the broadcast signals received, wherein content information associated with the respective television programs is stored in a storage unit;

program instructions responsive to identifying one or more respective tags, to compare the content information associated with the plurality of respective television programs stored in the storage unit for one or more respective tags to the input specifying the program content received from the viewer;

program instructions responsive to identifying a match of the one or more respective tags with the input specifying the program content, to identify, for each of the one or more respective tags, a classification associated with one or more of the plurality of respective television stations broadcasting in the plurality of respective television stations;

program instructions to identify respective contents of the respective television programs, wherein the tags comprise content information associated with television programs currently airing on a television station broadcasting, and wherein the content information is in a form of keywords; and program instructions to initiate display of one or more indications associated with one or more television stations airing television programs that the respective contents of one or more of the plurality of respective television programs match the input specifying the program content received from the viewer.

6. The computer program product as recited in claim 5 further comprising:

program instructions to receive input from the viewer to select an indication of the one or more indications; and program instructions to display a television station associated with the indication selected.

7. The computer program product as recited in claim 5, wherein the content information is stored in the storage unit, and wherein the content information stored comprises at least one keyword.

8. The computer program product as recited in claim 5, wherein the one or more indications comprise one or more respective icons.

9. A system for identifying television programs of interest to a viewer, the system comprising:

circuitry operable for receiving broadcast signals of a plurality of respective television programs currently being broadcast from a plurality of respective television stations, the broadcast signals for the respective television programs including tags inserted by one of continuously inserting or periodically inserting into the broadcast signals;

one or more processors, one or more computer-readable memories, one or more non-transitory computer-readable storage devices, and program instructions stored on at least one of the one or more non-transitory computer-readable storage devices for execution by at least one of the one or more processors via at least one of the one or more memories, the program instructions comprising:

program instructions to receive from a viewer of an entertainment unit input specifying a program content;

program instructions to process the broadcast signals for the plurality of respective television programs to identify the respective tags in the broadcast signals received, wherein content information associated with the plurality of respective television programs is stored in at least one of the one or more non-transitory computer-readable storage devices;

program instructions responsive to identifying one or more respective tags, to compare the content information associated with the plurality of respective television programs stored in a storage unit for one or more respective tags to the input specifying the program content received from the viewer;

program instructions responsive to identifying a match of the one or more respective tags with the input specifying the program content, to identify, for each of the one or more respective tags, a classification associated with one or more of the plurality of respective television stations broadcasting in the plurality of respective television stations;

program instructions to identify respective contents of the plurality of respective television programs, wherein the tags comprise content information associated with television programs currently airing on a television station broadcasting, and wherein the content information is in a form of keywords; and program instructions to initiate display of one or more indications associated with one or more television stations airing television programs that the respective contents of one or more of the plurality of respective television programs match the input specifying the program content received from the viewer.

10. The system as recited in claim 9, wherein the program instructions further comprise:

program instructions to receive input from the viewer to select an indication of the one or more indications; and program instructions to display a television station associated with the indication selected.

11. The system as recited in claim 9, wherein the content information is stored in at least one of the one or more non-transitory computer-readable storage devices, and wherein the stored content information comprises at least one keyword.

12. The system as recited in claim 11, wherein the at least one of the one or more non-transitory computer-readable storage devices is coupled to at least one of the one or more processors.

13. The system as recited in claim 9, wherein the one or more indications comprise one or more respective icons.

* * * * *